United States Patent Office 2,843,573
Patented July 15, 1958

2,843,573

NEW QUATERNARY AMMONIUM COMPOUNDS IN WHICH THE NITROGEN ATOM CARRIES AN ALKOXYMETHYL GROUP

Sidney Melamed, Philadelphia, Pa., assignor to Rohm & Haas Company, Philadelphia, Pa., a corporation of Delaware No Drawing. Application March 21, 1955
Serial No. 495,783

13 Claims. (Cl. 260—86.1)

This invention relates to new polymeric quaternary ammonium compounds and to their production. It is particularly concerned with the production of polymers, either homopolymers or copolymers, comprising units containing in a branch thereon quaternary ammonium nitrogen to which is directly attached an alkoxymethyl group. The preferred polymers are water-soluble or readily water-dispersible but by virtue of the alkoxymethyl groups are convertible to an insoluble condition.

Such copolymers have a wide variety of uses as will be pointed out more particularly hereinafter. They are particularly useful as adjuvants to paper for anchoring acidic polymers thereto and as agents for impregnating or coating textiles for various purposes. Because of the fact that they are readily converted to insoluble condition after incorporation in the paper or textile, they may be rendered resistant to removal therefrom during subsequent wetting, washing or scouring operations.

The polymeric compounds of the present invention are water-soluble or easily water-dispersible addition polymers of monoethylenically unsaturated monomers comprising at least 5 mole percent, and preferably at least 30 mole percent, of at least one unit of the group consisting of those having the structure of Formulas I, II, and III:

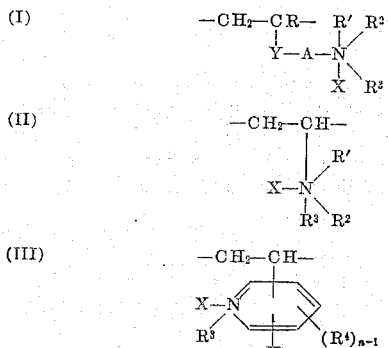

where R is hydrogen or methyl,

Y is O, —CONR—, —COO—,

A is a straight-chain or branched chain alkylene group having 2 to 3 carbon atoms, at least two of the carbon atoms thereof being connected in a chain between the N atom and Y group of the formula, $R'$ and $R^2$ are the same or different lower alkyl groups, preferably methyl or ethyl, X is a halogen, preferably chlorine, $R^3$ is an alkoxymethyl group having 2 to 5 carbon atoms, and is preferably methoxymethyl, $n$ is an integer having a value of 1 to 3, $R^4$ is a lower alkyl, such as methyl or ethyl and they may be the same or different when $n$ is 3.

The polymers may contain up to 95 mole percent of one or more other comonomers such as acrylonitrile, the vinyl aromatic compounds, more particularly the vinyl or other monoethylenically unsaturated substituted aromatic hydrocarbons (e. g., styrene, isopropenyl toluene, the various dialkyl styrenes, etc.), other aliphatic compounds containing a $CH_2=C=$ grouping, e. g., the various substituted acrylonitriles (e. g., methacrylonitrile, ethacrylonitrile, phenylacrylonitrile, etc.), acrylamide and the various substituted acrylamides (e. g., methacrylamide, ethacrylamide, the various N-substituted acrylamides which are different from those used in practicing the present invention and the various N-substituted alkacrylamides, for instance N-methylol acrylamide, N-monoalkyl and -dialkyl acrylamides and methacrylamides, e. g., N-monomethyl, -ethyl, -propyl, -butyl, etc. and N-dimethyl, -ethyl, -propyl, -butyl, etc. acrylamides and methacrylamides, N-monoaryl and -diaryl acrylamides and alkacrylamides, e. g., N-monophenyl and -diphenyl acrylamides and methacrylamides, etc.), vinyl esters, e. g., vinyl acetate, vinyl propionate, vinyl butyrate, vinyl isobutyrate, vinyl valerate, etc., esters of an acrylic acid (including acrylic acid itself and the various α-substituted acrylic acids, e. g., methacrylic acid, ethacrylic acid, phenylacrylic acid, etc.), more particularly the alkyl esters of an acrylic acid, e. g., the ethyl, propyl, isopropyl, n-butyl, isobutyl, sec-butyl, tert-butyl, amyl, hexyl, heptyl, octyl, decyl, dodecyl, etc. esters of acrylic, methacrylic, ethacrylic, phenylacrylic, etc. acids, vinyl ethers, such as butyl vinyl ether, N-vinyl compounds such as N-vinyl pyrrolidone, and olefins, such as ethylene, fluorinated vinyl compounds, such as vinylidene fluoride, as well as other vinyl aromatic and vinyl aliphatic compounds, and other compounds containing a single $CH_2=C=$ grouping.

If the polymer contains less than 30 mole percent of quaternary nitrogen containing units of Formulas I, II, and III, it preferably contains enough additional quaternary nitrogen containing units of other types to provide a total of at least 30 mole percent of quaternary nitrogen containing groups. Examples of other such units are those having the structure of Formula IV:

(IV) 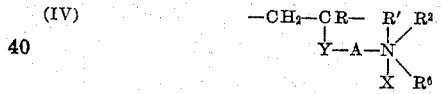
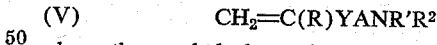

where the symbols have the same definition as before and $R^6$ may be benzyl, cyclohexyl, or an alkyl group having 1 to 4 carbon atoms.

The polymers comprising units of Formula I may be made by polymerizing or copolymerizing an amine having the structure of Formula V:

(V) $\quad CH_2=C(R)YANR'R^2$ where the symbols have the same definition as before, and then quaternizing part or all of the tertiary nitrogen groups by means of an alkylating agent of the formula $R^3X$, such as chloromethyl ether, with or without an alkylating agent $R^6X$, to provide at least 30% by weight of quarternized monomeric units in the polymer including at least 5 mole percent of units having the Formula I.

The polymers having units of Formula II may be those produced by the known process involving copolymerization of carbon monoxide and ethylene, subsequent reduction of the ketones formed, alkylation of the amines to tertiary condition, and quaternization of the t-amine with $R^3X$ with or without $R^6X$. The polymers having units of Formula III may be made by polymerization of the monomeric vinylpyridine and subsequent quaternization thereof with $R^3X$, with or without $R^6X$.

An alternate procedure to produce the polymers of the present invention having units of Formulas I and III is to quaternize corresponding monomers with $R^3X$, with or without $R^6X$, or one of such monomers with $R^3X$ and another wtih $R^6X$, and then to polymerize or copolymerize the quaternary ammonium compound or compounds obtained, with or without additional monomers.

Any known procedure for polymerizing the compounds may be employed either for polymerizing the amine or amines before quaternization or for polymerizing the quaternized monomer or monomers. For example, to form polymers having units of Formulas I and III, various free radical catalysts may be used such as hydrogen peroxide, organic peroxide, such as butyl perbenzoate or benzyl peroxide or azo catalysts such as azodiisobutyronitrile. Such catalyst may be employed for polymerization in bulk or in solution. On the other hand, if polymerization is to be effected in emulsions or dispersions of the monomers, ammonium persulfate or alkali metal persulfates may be employed. Polymerization may be effected at 60° to 100° C. and the amount of catalyst or initiator may be from 0.1% to about 20% by weight of the monomer or monomers. Polymerization may be carried out in an inert atmosphere such as nitrogen.

The alkylation and/or quaternization of the monomer or monomers, or of the polymer is preferably effected in a polar solvent such as water, ethanol, acetonitrile, dimethylformamide, or glycol ethers such as ethoxyethyl hydroxyethyl ether or mixtures of one of these solvents with benzene or toluene at a temperature of 60° C. to 100° C. for a period of about two to twelve hours. The alkylating agent $R^3X$ may be used in a quantity that is molarly equivalent to the total number of amine groups in the polymer to quaternize all of such groups. However, when there are more than 5 mole percent of the monomeric units containing a quaternizable amine group, it is unnecessary to quaternize all of such amine groups and the amount of quaternizing agent may be less than the amount required to quaternize all of the amine groups in the polymer provided sufficient is used to provide 5 mole percent of quaternized monomeric units having the structure of one of Formulas I, II, and III in the final polymer.

The molecular weight of the final quaternized polymer is not critical. It may vary from as few as 10 monomeric units to a molecular weight of the order of 500,000 or more.

An alternate procedure for producing polymers of Formula I in which Y is —CONR— is to aminolyze polymers of an ester of acrylic or methacrylic acid, preferably poly(methyl acrylate) or a copolymer of at least 5 mole percent, and preferably at least 30 mole percent, of methyl acrylate, by means of at least one amine of Formula VI:

(VI)        $HNRANR'R^2$ where the symbols are the same as defined above. Generally, aminolysis is performed in a medium which is anhydrous or contains but little water unless considerable carboxyl groups are desired in the final polymeric product. The amine or amine mixture itself may serve as the solvent as well as the reactant for aminolyzing the polymerized methyl acrylate and aminolysis may be effected at temperatures of 90° to 130° C. in a time of 96 hours to 24 hours respectively, the time required generally being inversely proportional to the temperature. In the presence of a 3-to-4-fold excess of amine, complete aminolysis may be effected in the times and the temperatures just mentioned, and it has been found that the higher the temperature employed, the higher is the final molecular weight of polymer obtained. A catalyst to accelerate the reaction is unnecessary, but an alkoxide, such as sodium methoxide, sodium ethoxide, or the like, may be used in amounts of from ½% to 20% by weight of the polymer. With a catalyst, an amount of the amine or amine mixture equivalent to the ester groups to be aminolyzed may be dissolved in a solvent such as toluene or additional amine, either the same or different, or an alcohol, such as methanol, ethanol, or butanol, and the complete aminolysis may be obtained in eight hours at a temperature of 80° to 90° C. An advantageous system is to start in toluene in which the polymerized ester is soluble and during the reaction to add an alcohol such as methanol, ethanol, or butanol in which the aminolyzed polymer is soluble, and subsequently to remove the solvent to obtain the final polymer.

The polymeric esters of alcohols other than methyl, such as of ethyl alcohol, propyl alcohol, butyl alcohol, and so on, require an increase in the time and temperature factor to produce a corresponding conversion of ester groups to amido groups in the polymer. Generally, when an amine used contains a primary nitrogen atom, it is necessary to maintain the reaciton medium containing the polymeric ester and amine at a temperature below 130° C. in order to avoid imide formation with consequent cross-linking and insolubilization of the final polymer. However, when the aminolysis is effected by amines containing secondary nitrogen atoms but no primary nitrogen atom, there is no possibility of cross-linking or imide formation so that higher temperatures may be used up to 180° to 200° C.

Polymerized esters of the unsaturated acids in which the α-carbon atom is substituted by an alkyl group, such as methyl, ethyl, propyl or isopropyl, of which methyl methacrylate, methyl ethylacrylate and methyl propylacrylate are typical, are more difficult to aminolyze and when an amine containing a primary nitrogen atom is used, it is difficult to get aminolysis of 60% to 100% of the ester groups without cross-linking. Generally, however, the aminolysis may be effected at temperatures of 180° to 200° C. for three to seven hours with production of uncross-linked products which are up to 60% aminolyzed. Generally to get a larger proportion of the ester groups or all thereof in the polymer aminolyzed, a 5-to-10-fold excess of amine may be reacted at a temperature of 130° C. for a time of from four to seven days. Alternatively, an alkoxide catalyst may be used with 2-to-4-fold excess amine or an amount of amine equivalent to the ester groups to be aminolyzed may be used at 130° C.

As the alkyl substituent on the α-carbon of the acrylic acid increases in size, more drastic conditions are generally required. Similarly, as the alkyl group of the ester increases in size, more drastic conditions are necessary to effect aminolysis; thus, when polymerized methyl methacrylate is replaced with polymerized ethyl methacrylate, longer times and higher temperatures must be used. As already stated, imide formation may be prevented by the use of amines which contain a secondary nitrogen atom but no primary nitrogen atom.

The difference in reactivity of these various esters makes it possible to obtain for all practical purposes a selective aminolysis of copolymers containing different ester units. For example, when the final quaternary ammonium compound desired to be produced is one containing methyl methacrylate as comonomer units, a copolymer of methyl methacrylate with at least 5 mole percent of methyl acrylate may serve as a starting material so that aminolysis converts the ester groups of the methyl acrylate units to amide units without affecting the ester units of the methyl methacrylate to any considerable extent. Such an aminolysis, for example, may be effected at 80° to 120° C. in the presence of an amount of an amine mixture which is equivalent to the ester groups in the methyl acrylate portion of the copolymer. Similarly, if it is desired to produce a copolymer containing quaternary ammonium groups with one or more comonomers of non-ester type listed hereinabove such as of styrene, a corresponding copolymer, as of styrene and methyl acrylate, may be used as the starting material in which the proportion of acrylate units corresponds to the number of acrylamide units desired and all such acrylate units may be converted to amide groups in the aminolysis.

The new compounds are viscous to solid resinous materials and the preferred polymers containing at least 30 mole percent of quaternary nitrogen-containing groups are of water-soluble character or at least readily water-dispersible character. They are generally also soluble in organic solvents, such as dimethylformamide, hydrocarbons, such as xylenes, toluene, and solvent naphthas, and chlorinated hydrocarbons, such as chloroform, carbon tetrachloride, and ethylene dichloride, when they contain less than 30 mole percent of quaternay groups, and, in the case of the preferred polymers, in solvents of polar type, such as alcohols, especially the lower alcohols, methanol, ethanol, propanol, isopropanol and the butyl alcohols, and also in acetonitrile, dimethylformanide and so on. When the polymers are free of units containing carboxyl or free amine groups, they are generally substantially neutral. The polymeric compounds of the present invention can be isolated by any of numerous conventional procedures, such as by freeze-drying, evaporation of solvents from the reaction mixtures containing them, or the like.

All of the polymers of the present invention contain the reactive alkoxymethyl, such as methoxymethyl, group adapting them to be converted into durable components of any system to which they are applied. Thus, the preferred readily water-dispersible polymeric compounds are easily applied through aqueous or alcoholic media to various substrates including those of paper, leather, textiles or the like and are adapted to be converted to insoluble condition merely by heating preferably in the presence of an acidic catalyst which may be incorporated onto the substrate at the same time as it is impregnated with the polymeric compounds of the present invention. Thus, substrates of wool, cellulose, rayon, cellophane, cotton, cellulose esters, such as cellulose acetate or cellulose acetate butyrate, polyvinyl alcohols, polyamides of the nylon type, homopolymers or copolymers of acrylamide or methacrylamide, may be impregnated or coated with solutions of the polymers of the present invention and a small amount, from ½% to 2%, on the weight of the polymer of the present invention, of an acidic catalyst and after drying, the treated substrate may be subjected to baking or curing operations in which the polymer applied is converted to an insoluble condition which may or may not involve reaction with the substrate as well. As an acidic catalyst there may be used hydrochloric, sulfuric, oxalic, or phosphoric acids, ammonium phosphate, ammonium thiocyanate, hydrochloric or other acid salts of a hydroxy aliphatic amine including 2-methyl-2 - amino - 1 - propanol, 2 - methyl - 2 - amino - 1,3 - propandiol, tris(hydroxymethyl)aminomethane, 2-phenyl-2-amino-1-propanol, 2-methyl-2-amino-1-pentanol, 2-aminobutanol, triethanolamine, 2-amino-2-ethyl-1-butanol, also ammonium chloride, pyridine hydrochloride, benzyl dimethylamine oxalate.

Thus, the compounds may be applied to hydrophobic textile materials of the types mentioned above in an amount of 2% to 10% on the weight of the textile material to provide an antistatic finish which can be converted to insoluble condition by drying and baking or curing at a temperature of 240° to 450° F. for periods of time which are inversely proportional to the temperature, such as for a period of about 30 minutes at 240° F., about 10 minutes at 300° F., and 15 to 30 seconds at 450° F. When the polymers comprise a hydrophobic component, they may be applied in aqueous solution to a textile, leather or the like, and after curing they may serve to impart water-repellency or water-proofing characteristics depending upon the extent of hydrophobicity of the polymer. The compounds may be applied to hydrophilic material, such as cotton and wool to modify the physical and chemical properties thereof, either in the form of yarns or fabrics. Thus, they may modify the feel, generally improving the softness thereof; the dyeability, generally increasing the affinity of the textile to certain types of dyes; or they may be applied to impart improved dimensional stability and resistance to shrinkage on washing of the fabrics, or to increase the resistance to creasing.

Those polymers having insufficient quaternary ammonium groups to render them readily water-dispersible may be dissolved in hydrocarbons, such as xylenes, chlorinated hydrocarbons, such as chloroform or carbon tetrachloride, or in such solvents as dimethylformamide, and applied to textiles or other substrates to provide a finish that modifies the feel, such as the softness, of the materials treated, such as rayon, cotton, or the like.

For the application to textiles, the compounds of the present invention may be combined with auxiliary agents, such as those of aminoplast types, particularly the water-soluble urea-formaldehyde, triazine-formaldehyde, such as melamine-formaldehyde, heat-convertible condensates, especially where increased stiffness or resistance to creasing is desired.

In the following examples, which are illustrative of the present invention, the parts and percentages are by weight unless otherwise indicated:

*Example 1*

(a) A mixture of 115 grams of dimethylaminoethylvinyl ether and 17 grams of dimethyl azoisobutyrate is heated in a flask at 75° C. for 24 hours. The resultant viscous polymer solution is freed of monomer by heating at 100° C. at 0.1 to 0.2 mm. of Hg pressure for 12 hours. The resultant polymer, obtained in a conversion of 60%, is a viscous yellow oil containing 10.5% nitrogen and having a number average molecular weight of approximately 1200.

(b) A solution of 67 grams of the polymer of part (a), equivalent to a half mole of basic nitrogen, in 200 ml. of methanol is treated slowly with 41 grams of monochloromethyl methyl ether. The resultant solution is warmed for two hours. Removal of the solvent at reduced pressure gives the product, poly(vinyloxyethyldimethylmethoxymethylammonium chloride), a water-soluble, tan solid.

(c) A 10% aqueous solution is prepared from the polymer of part (b). Samples of polyester (ethylene glycol terephthalate polymer), polyacrylonitrile and polyamide fabrics, commercially designated as Dacron, Orlon and nylon, are padded through the polymer solution such that the resin pickup is between 3% and 5% of the weight of the fabric. The samples are dried at 220° F. and then cured at 300° F. for 2 to 10 minutes. Duplicate samples are similarly treated except that after drying they are wetted back by spraying with an aqueous solution containing 0.5% of ammonium chloride. These samples are then redried and cured as above. All of the samples showed greatly decreased tendency to develop or retain electrostatic charges as compared to untreated controls. After five washes in a launderometer the treated samples of both sets still retained resistance to the development of static charge. The samples all showed some loss in this property over the unwashed, treated samples with the acid catalyzed samples showing better retention of antistatic properties. All samples, washed and unwashed, were better than the untreated controls.

*Example 2*

Poly(dimethylaminoethyl methacrylate) is prepared by polymerization of the acetate salt in aqueous solution. A solution of one mole of the polymer as the free base in ethanol is treated with 1.1 molar equivalents of methyl chloromethyl ether in a manner similar to Example 1(b). The product is an ethanol solution of the polyquaternary, poly(methacryloxyethyldimethylmethoxymethylammonium chloride).

The solution is diluted with water to 10% solids and is directly applied to hydrophobic fabrics. Samples of Orlon, Dacron, nylon, cellulose acetate and saran (copolymer of vinylidene chloride and vinyl chloride) fabrics are padded through the solution of polymer and then dried and cured as described in Example 1(c). All of the fabrics acquire antistatic properties which they retain after washing or dry-cleaning. The treatment in addition to providing durable protection from static charge does not adversely change the hand or feel of the fabrics and does not stiffen or yellow the fabrics.

Example 3

(a) A sample of poly(methyl acrylate) of average molecular weight 20,000 is dissolved in a 3 molar excess of 3-aminopropylmorpholine, and the solution heated at 130° C. for 24 hours. The resultant polymer, isolated by removal of excess amine by stripping and precipitation, is essentially poly(3-morpholinopropylacrylamide).

(b) A solution of five parts by weight of this polymer in 20 parts of absolute ethanol is treated with 3 parts by weight of butyl chloromethyl ether and the mixture heated at reflux for five hours. The polymeric quaternary can be isolated as a water-soluble solid by removal of solvent and excess chloromethyl ether and corresponds in structure to poly(acrylamidopropylbutoxymethylmorpholinium chloride).

(c) The polyquaternary material obtained in part (b) is an effective fungicide giving 100% control of *Monilinia fructicola* or *Stemphylium sarcinaeforme* at one part in ten thousand. The polymer of this example is particularly useful as a textile agent imparting durable antistatic properties to hydrophobic fabrics with little or no undesirable effects when applied as described in Example 1(c).

Example 4

Poly(4-vinylpyridine) is dissolved in acetonitrile and treated with a molar equivalent of chloromethyl methyl ether. The solution is heated at reflux for 8 hours. The polymer, poly(methoxymethyl-4-vinylpyridinium chloride), is used to treat textile fabrics, including cellulose acetate-butyrate to impart durable antistatic properties.

Example 5

A copolymer of ethylene and carbon monoxide is converted to a polymer containing units of dimethyl vinyl amine. Quaternization is effected with methyl chloromethyl ether by the procedure of Example 1(b). The product is applied to nylon textile fabrics and upon drying and curing at 350° F. for 10 minutes imparts a durable antistatic finish.

Example 6

(a) The procedure of Example 3(a) is repeated substituting 3-dimethylaminopropylamine for the 3-aminopropylmorpholine.

(b) To a solution in 20 parts of absolute ethanol of 5 parts by weight of the poly(3-dimethylaminopropylacrylamide) obtained in part (a) hereof, there is added 2.5 parts of methyl chloromethyl ether. The mixture is heated at reflux for four hours. Solvent and remaining chloromethyl ether are stripped off leaving a water-soluble poly(acrylamidopropyldimethylmethoxymethylammonium chloride).

(c) The polymer obtained in part (b) hereof is applied to Dacron, Orlon, and nylon fabrics by the procedure of Example 1(c). The fabrics thus treated had a durable antistatic finish thereon.

It is to be understood that changes and variations may be made without departing from the spirit and scope of the invention as defined in the appended claims.

I claim:

1. A composition comprising a linear addition polymer of polymerizable monoethylenically unsaturated molecular in which at least 5 mole percent of the units thereof have side groups comprising quaternary ammonium nitrogen atoms directly attached to alkoxymethyl groups having from 2 to 5 carbon atoms, said polymer containing from 0 to 95 mole percent of polymerized units selected from the group consisting of acrylates of alcohols having 1 to 12 carbon atoms, and those units having the formulas:

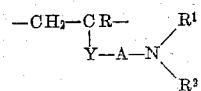

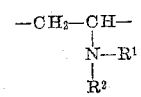

and

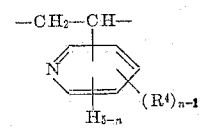

where R is selected from the group consisting of hydrogen and methyl, Y is selected from the group consisting of O, —CONR—, and —COO—, A is an alkylene group having 2 to 3 carbon atoms, at least two of the carbon atoms thereof being extended in a chain between the N atom and Y group of the formula, $R^1$ is a lower alkyl group, $R^2$ is a lower alkyl group, $R^4$ is a lower alkyl group, and $n$ is an integer having a value of 1 to 3.

2. A composition comprising a polyquaternary ammonium compound of a polyvinyl amine in which at least 5 mole percent of the amine groups comprise a quaternary nitrogen atom attached directly to an alkoxymethyl group having 2 to 5 carbon atoms, said compound containing 0 to 95 mole percent of polymerized units selected from the group consisting of acrylates of alcohols having 1 to 12 carbon atoms, and those units having the formulas:

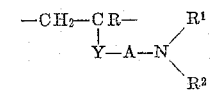

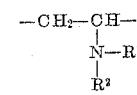

and

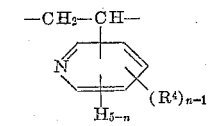

where R is selected from the group consisting of hydrogen and methyl, Y is selected from the group consisting of O, —CONR—, and —COO—, A is an alkylene group having 2 to 3 carbon atoms, at least two of the carbon atoms thereof being extended in a chain between the N atom and Y group of the formula, $R^1$ is a lower alkyl group, $R^2$ is a lower alkyl group, $R^4$ is a lower alkyl group, and $n$ is an integer having a value of 1 to 3.

3. A composition comprising at least partially quaternized polymer of a vinyl pyridine containing at least 5 mole percent of units in which the nitrogen of the pyridine ring is quaternized and attached directly to an alkoxymethyl group having 2 to 5 carbon atoms, said polymer containing from 0 to 95 mole percent of polymerized units selected from the group consisting of acrylates of alcohols having 1 to 12 carbon atoms, and those units having the formulas:

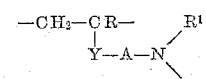

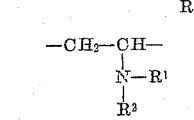

and

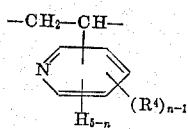

where R is selected from the group consisting of hydrogen and methyl, Y is selected from the group consisting of O, —CONR—, and —COO—, A is an alkylene group having 2 to 3 carbon atoms, at least two of the carbon atoms thereof being extended in a chain between the N atom and Y group of the formula, R¹ is a lower alkyl group, R² is a lower alkyl group, R⁴ is a lower alkyl group, and n is an integer having a value of 1 to 3.

4. A composition comprising a polymer of polymerizable monoethylenically unsaturated monomers comprising at least 5 mole percent of at least one monomer selected from the group consisting of compounds having the structure of one of the following three formulas:

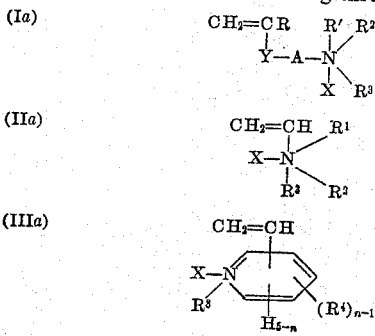

where R is selected from the group consisting of hydrogen and methyl, Y is selected from the group consisting of O, —CONR—, and —COO—, A is an alkylene group having 2 to 3 carbon atoms, at least two of the carbon atoms thereof being extended in a chain between the N atom and Y group of the formula, R' is a lower alkyl group, R² is a lower alkyl group, R³ is an alkoxymethyl group having 2 to 5 carbon atoms, R⁴ is a lower alkyl group, X is a halogen atom, and n is an integer having a value of 1 to 3, said polymer containing from 0 to 95 mole percent of polymerized units selected from the group consisting of acrylates of alcohols having 1 to 12 carbon atoms, and those units having the formulas:

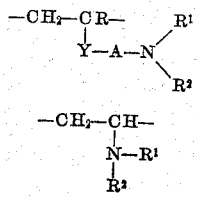

and

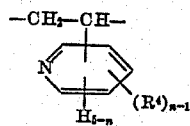

where R is selected from the group consisting of hydrogen and methyl, Y is selected from the group consisting of O, —CONR—, and —COO—, A is an alkylene group having 2 to 3 carbon atoms, at least two of the carbon atoms thereof being extended in a chain between the N atom and Y group of the formula, R' is a lower alkyl group, R² is a lower alkyl group, R⁴ is a lower alkyl group, and n is an integer having a value of 1 to 3.

5. A composition as defined in claim 4 in which the polymer comprises at least 30 mole percent of units containing quaternary ammonium nitrogen.

6. A composition as defined in claim 4 in which the monomers comprise at least 30 mole percent of at least one monomer selected from the group consisting of compounds of the Formulas Ia, IIa, and IIIa.

7. A composition comprising a polymer of

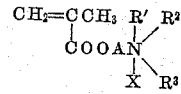

where A is an alkylene group having 2 to 3 carbon atoms, at least two of the carbon atoms thereof being extended in a chain between the N and O atoms of the formula, R' is a lower alkyl group, R² is a lower alkyl group, R³ is an alkoxymethyl group having 2 to 5 carbon atoms, and X is a halogen atom.

8. A composition comprising a polymer of

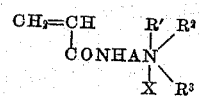

where A in an alkylene group having 2 to 3 carbon atoms, at least two of the carbon atoms thereof being extended in a chain between the nitrogen atoms of the formula, R' is a lower alkyl group, R² is a lower alkyl group, R³ is an alkoxymethyl group having 2 to 5 carbon atoms, and X is a halogen atom.

9. A composition comprising a polymeric vinyloxyethyldimethylmethoxymethylammonium chloride.

10. A composition comprising a polymeric methacryloxyethyldimethylmethoxymethylammonium chloride.

11. A composition comprising a polymeric acrylamidopropylbutoxymethylmorpholinium chloride.

12. A composition comprising a polymeric methoxymethyl-4-vinylpyridinium chloride.

13. A composition comprising a polymeric acrylamidopropyldimethylmethoxymethylammonium chloride.

References Cited in the file of this patent

UNITED STATES PATENTS

| | | |
|---|---|---|
| 2,138,763 | Graves | Nov. 29, 1938 |
| 2,744,130 | Winberg | May 1, 1956 |

UNITED STATES PATENT OFFICE
CERTIFICATE OF CORRECTION

Patent No. 2,843,573                                              July 15, 1958

Sidney Melamed

It is hereby certified that error appears in the printed specification of the above numbered patent requiring correction and that the said Letters Patent should read as corrected below.

Column 7, line 70, for "molecular" read -- molecules --.

Signed and sealed this 23rd day of September 1958.

(SEAL)
Attest:

KARL H. AXLINE
Attesting Officer

ROBERT C. WATSON
Commissioner of Patents